(12) United States Patent
Kim

(10) Patent No.: US 6,914,776 B2
(45) Date of Patent: Jul. 5, 2005

(54) PERSONAL DIGITAL ASSISTANT WITH KEYBOARD

(75) Inventor: Young S. Kim, Los Altos, CA (US)

(73) Assignee: Samsung Electronics Co., Ltd. (KR)

( * ) Notice: Subject to any disclaimer, the term of this patent is extended or adjusted under 35 U.S.C. 154(b) by 41 days.

(21) Appl. No.: 10/422,326

(22) Filed: Apr. 23, 2003

(65) Prior Publication Data
US 2004/0023696 A1 Feb. 5, 2004

Related U.S. Application Data
(60) Provisional application No. 60/375,298, filed on Apr. 23, 2002.

(51) Int. Cl.[7] .................................................. G06F 1/16
(52) U.S. Cl. ........................ 361/683; 345/168; 455/566; D14/396
(58) Field of Search ................................. 361/680–683; 455/566, 556, 557, 553, 550.1; D14/320, 396; 341/22; 345/168, 169; 400/482, 693, 88, 691

(56) References Cited

U.S. PATENT DOCUMENTS

| | | | | |
|---|---|---|---|---|
| 5,712,760 A | * | 1/1998 | Coulon et al. | 361/680 |
| 5,982,613 A | * | 11/1999 | Sternglass et al. | 361/680 |
| 5,995,025 A | * | 11/1999 | Sternglass et al. | 341/22 |
| 6,297,752 B1 | * | 10/2001 | Ni | 341/22 |
| D454,347 S | * | 3/2002 | Chung et al. | D14/320 |
| 6,594,142 B2 | * | 7/2003 | Katz | 361/680 |
| 6,628,508 B2 | * | 9/2003 | Lieu et al. | 361/680 |
| 6,671,170 B2 | * | 12/2003 | Webb et al. | 361/680 |
| 2002/0163778 A1 | * | 11/2002 | Hazzard et al. | 361/683 |
| 2003/0048595 A1 | * | 3/2003 | Hsieh et al. | 361/680 |
| 2003/0078069 A1 | * | 4/2003 | Lindeman | 455/550 |
| 2003/0103041 A1 | * | 6/2003 | Nguyen et al. | 345/168 |

* cited by examiner

Primary Examiner—Lisa Lea-Edmonds
(74) Attorney, Agent, or Firm—Dilworth & Barrese, LLP

(57) ABSTRACT

A personal digital assistant comprises a housing having the top and a bottom. A display screen at the top of the housing. A keyboard hinged to one side of the housing and adapted to rotate from a first position where it is stored on the bottom of the housing with the keys facing the housing and a second position where it overlies a portion of the display screen with the keys exposed for manipulation by the user and the remaining portion of the screen displays information.

9 Claims, 2 Drawing Sheets

PERSONAL DIGITAL ASSISTANT WITH KEYBOARD

RELATED APPLICATIONS

This application claims priority to provisional Application Ser. No. 60/375,298 filed Apr. 23, 2002.

FIELD OF THE INVENTION

This invention relates generally to personal digital assistants (PDAs) and more particularly to PDAs with a keyboard.

BACKGROUND OF THE INVENTION

PDAs are typically too small to incorporate a keyboard, and often use a pen as the main interface for the user. Recently, PDAs have been introduced into the market which include a small keyboards which are manipulated with a single finger, usually the thumb, as the fingers of the same hand support the PDA.

SUMMARY OF THE INVENTION

The present invention provides PDAs with the optional capability of a large sized keyboard. This relieves the PDAs from being limited to pen input or input from a miniature keyboard.

The present invention provides a PDA which includes a keyboard attached by a hinge to the side of the PDA. This allows the keyboard to be rotated from first storage position on the bottom of the housing to a second position on the top of the PDA where the keys are available for manipulation by the user with a portion of the display screen available for viewing.

DESCRIPTION OF THE PREFERRED EMBODIMENT

Figure 1:
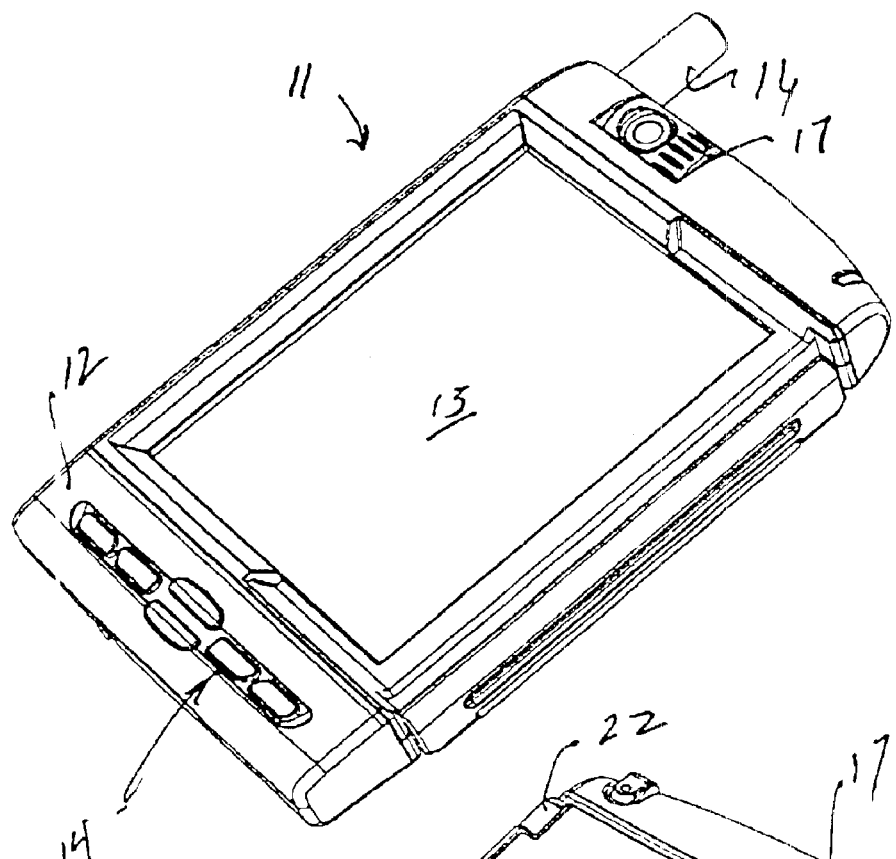
FIG. 1 is a perspective top view of a PDA in accordance with the present invention.
Figure 2:
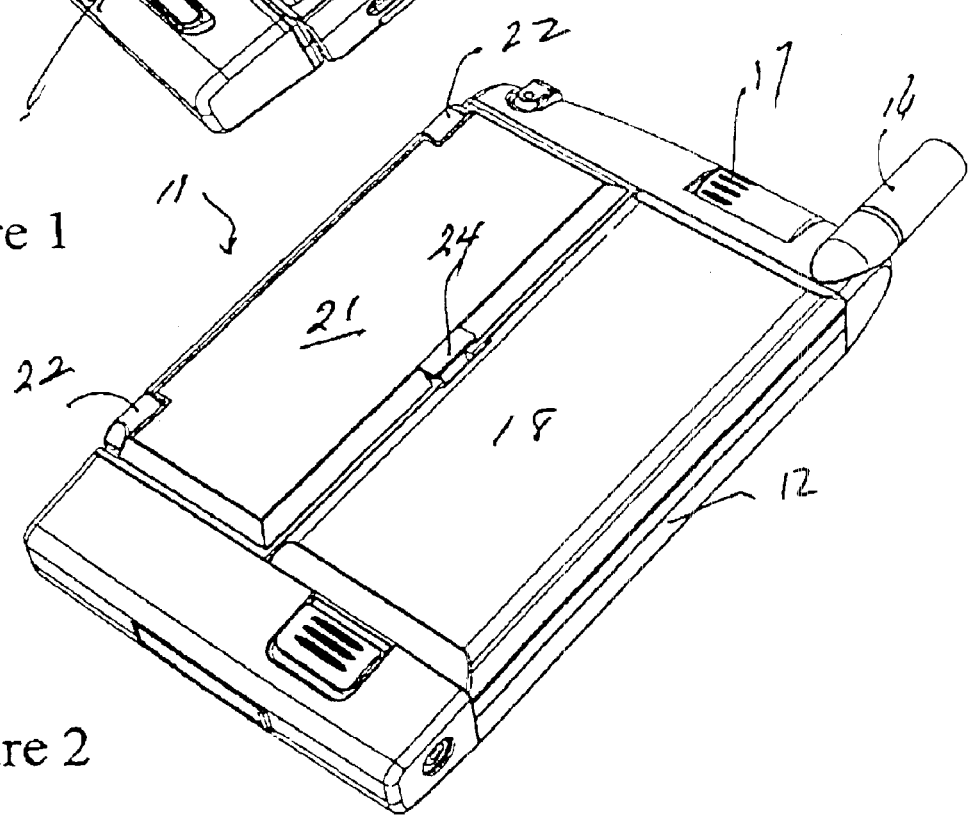
FIG. 2 is a perspective bottom view.

Referring to the Figures, the PDA 11 includes a housing or body 12 provided with a display or touch screen 13. Conventional function and control keys 14 are manipulated when the PDA is in its conventional mode of operation. A pen 16 is available for input of information via the touch screen 13. The PDA includes an antenna 16 and camera 17. A battery pack 18 is removably supported on the back of the housing 12. Although not shown the PDA may include a microphone and speaker to provide for voice communication.

In accordance with the present invention, a keyboard 21 is hinged to the side of the housing by a hinge 22. In the storage or first position, the keyboard rests on the back of the housing with the keys facing the housing, whereby they are protected. The latch 24 latches the keyboard in position. The battery and keyboard are at substantially the same level.

Figure 3:
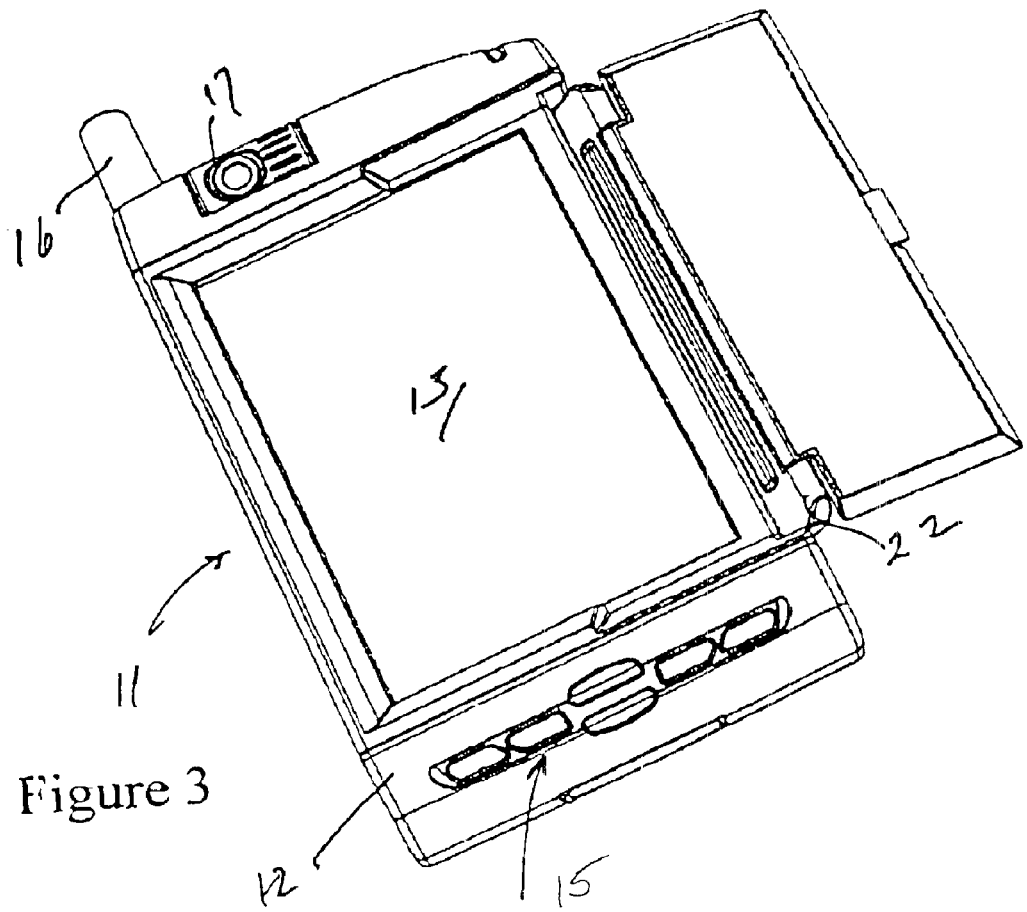
FIG. 3 is a perspective view showing the keyboard being rotated from the first on storage position into use position.
Figure 4:
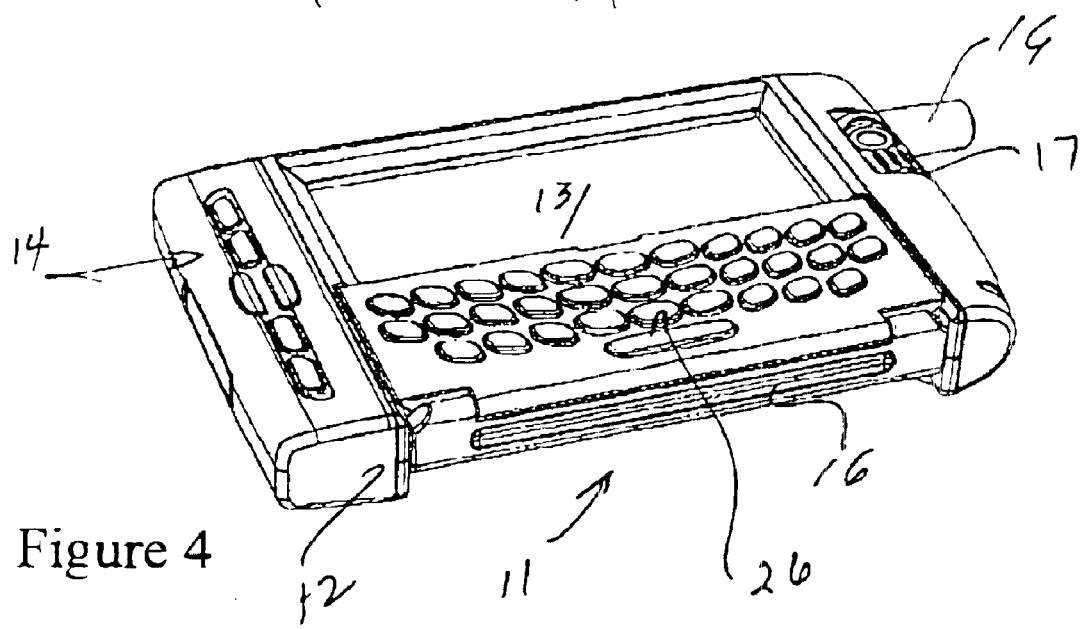
FIG. 4 is a perspective view showing the keyboard in position for manipulation of the keys by the user.

The keyboard can be rotated from the storage or first position as shown in FIG. 3 and to a second position over a portion of the touch screen 13 as shown in FIG. 4. When the keyboard is positioned over a portion of the screen, the hinge movement switches the display from a portrait format to a landscape format. A switch (not shown) is provided in the hinge mechanism to switch the format of the display. Thus, information is displayed only on the exposed portion of the screen. Information entered by the keys or received is then displayed in the landscape format. Thus, there has been provided a PDA with an integral large sized keyboard.

What is claimed is:

1. A personal digital assistant, comprising:

a housing;

a display screen on the front of the housing, the screen adapted to function both in a portrait format in a first position and landscape format in a second position; and a keyboard hinged to one side of the housing and adapted to rotate to a first position to the back of the housing with the keys facing the housing for storage of the keyboard and to a second position on the top of the housing over a portion of the display screen with the keys exposed for manipulation by the user, wherein the keyboard is oriented in the second position for manipulation while the display screen is in the landscape format.

2. A personal digital assistant as in claim 1, including switching means for switching the display screen from the portrait format to the landscape format when the keyboard is rotated from the first position to the second position.

3. A personal digital assistant as in claim 1, including a latch for latching the keyboard in the first position.

4. A personal digital assistant as in claim 1, including a pen removably carried by the housing.

5. A personal digital assistant, comprising:

a housing;

a battery supported on the back of the housing;

a display screen on the front of the housing, the screen adapted to function both in a portrait format in a first position and landscape format in a second position; and a keyboard hinged to one side of the housing and adapted to rotate to a first position on the back of the housing with the keys facing the housing for storage of the keyboard and to a second position on the top of the housing over a portion of the display screen with the keys exposed for manipulation by the user and the exposed portion of the screen displaying information, wherein the keyboard is oriented in the second position for manipulation while the display screen is in the landscape format.

6. A personal digital assistant as in claim 5, including switching means for switching the display screen from the portrait format to the landscape format when the keyboard is rotated from the first position to the second position.

7. A personal digital assistant as in claim 5, including a latch for latching the keyboard in the first position.

8. A personal digital assistant as in claim 5, including a pen removably carried by the housing.

9. A personal digital assistant as in claim 5, in which the battery and keyboard are at substantially the same level when the keyboard is in the first position.

* * * * *